(12) United States Patent
Pavitt et al.

(10) Patent No.: US 10,931,618 B2
(45) Date of Patent: Feb. 23, 2021

(54) CONTROL OF NOTIFICATIONS TO A USER OF AN ELECTRONIC MESSAGING SYSTEM

(71) Applicant: International Business Machines Corporation, Armonk, NY (US)

(72) Inventors: Joe D. S. Pavitt, Chandler's Ford (GB); Charlotte A. Jobson, Headley Down (GB); Nnadozie E. Okeke, London (GB); Carolyn A. Mabbott, Southampton (GB); Benjamin N. A. Durrans, Hampton (GB)

(73) Assignee: International Business Machines Corporation, Armonk, NY (US)

( * ) Notice: Subject to any disclaimer, the term of this patent is extended or adjusted under 35 U.S.C. 154(b) by 28 days.

(21) Appl. No.: 16/008,873

(22) Filed: Jun. 14, 2018

(65) Prior Publication Data
US 2019/0386946 A1   Dec. 19, 2019

(51) Int. Cl.
*H04L 12/58* (2006.01)

(52) U.S. Cl.
CPC .............. *H04L 51/24* (2013.01); *H04L 51/16* (2013.01)

(58) Field of Classification Search
CPC ...... G06Q 10/107; G06Q 10/10; H04L 51/16; H04L 51/26; H04L 12/40163; H04L 51/24
See application file for complete search history.

(56) References Cited

U.S. PATENT DOCUMENTS

| | | | |
|---|---|---|---|
| 7,480,696 B2 | 1/2009 | Kirkland | |
| 9,298,355 B1* | 3/2016 | Beausoleil | G06F 16/168 |
| 9,384,186 B2 | 7/2016 | Harari | |
| 9,813,495 B1 | 11/2017 | Van Rensburg | |
| 2008/0082607 A1* | 4/2008 | Sastry | G06F 16/986 709/204 |
| 2009/0210497 A1 | 8/2009 | Callanan | |
| 2010/0262917 A1* | 10/2010 | Hardy | G06Q 10/107 715/735 |
| 2011/0161987 A1 | 6/2011 | Huang | |
| 2011/0264737 A1* | 10/2011 | Skinner | G06Q 10/10 709/204 |
| 2013/0174058 A1 | 7/2013 | Kaul | |
| 2014/0280890 A1 | 9/2014 | Yi | |
| 2015/0046371 A1* | 2/2015 | Leary | G06F 40/253 705/347 |

(Continued)

OTHER PUBLICATIONS

List of IBM Patents and Patent Applications Treated as Related, dated Jul. 24, 2019. 2 pages.

(Continued)

*Primary Examiner* — Chris Parry
*Assistant Examiner* — Abderrahmen Chouat
(74) *Attorney, Agent, or Firm* — Jay Wahlquist

(57) ABSTRACT

An example method of controlling notifications to a user of an electronic messaging system comprises controlling communication of a notification associated with a thread of the electronic messaging system to the user based on a determined level of interest of the user in a topic of the thread and at least one of: the obtained timing information relating to the timing of the most recent notification associated with the thread; and an obtained measure of similarity between the topic of the thread and a second topic associated with the most recent notification associated with the thread.

8 Claims, 5 Drawing Sheets

(56) References Cited

U.S. PATENT DOCUMENTS

| | | | |
|---|---|---|---|
| 2016/0004410 A1* | 1/2016 | Srinivasan | G06F 3/04842 |
| | | | 715/765 |
| 2016/0134574 A1 | 5/2016 | Bender | |
| 2016/0255037 A1 | 9/2016 | Spivack | |
| 2016/0344800 A1 | 11/2016 | Emmanuel | |
| 2017/0017351 A1 | 1/2017 | Singh | |
| 2017/0118159 A1* | 4/2017 | Ratiu | H04L 67/22 |
| 2018/0048604 A1* | 2/2018 | Mikhailov | H04L 51/16 |
| 2018/0310042 A1* | 10/2018 | Mayalil | H04N 21/4122 |

OTHER PUBLICATIONS

Pavitt, et al., "Control of Notifications to a User of an Electronic Messaging System", U.S. Appl. No. 16/520,804, filed Jul. 24, 2019.

"Guide to Slack notifications ", Slack Help Center, Last printed Apr. 16, 2018, 3 pages, <https://get.slack.help/hc/en-us/articles/201895138-Guide-to-Slack-notifications>.

"Method to customize chat alerts based on defined user preferences", An IP.com Prior Art Database Technical Disclosure, Disclosed Anonymously, IP.com No. IPCOM000235576D, IP.com Electronic Publication Date: Mar. 10, 2014, 3 pages.

"Natural Language Understanding", Watson, Last printed Jan. 10, 2018, 4:12 PM EST, 7 pages, <https://www.ibm.com/watson/services/natural-language-understanding/>.

"Probabilistic latent semantic analysis", Wikipedia, This page was last edited on Nov. 10, 2017, at 13:54, 3 pages, <https://en.wikipedia.org/wiki/Probabilistic_latent_semantic_analysis>.

Dong, et al., "Structural Analysis of Chat Messages for Topic Detection", Research paper, School of Computer Engineering, Nanyang Technological University, Singapore, May 2, 2006, pp. 1-33.

Anonymous, et al., "A mechanism to dynamically turn off/on the notification based on user behaviors in group chat", An IP.com Prior Art Database Technical Disclosure, IP.com No. IPCOM000248911D, IP.com Electronic Publication Date: Jan. 22, 2017, 6 pgs.

Anonymous, et al., "Automatic post notification method and system in group chat", An IP.com Prior Art Database Technical Disclosure, IP.com No. IPCOM000200358D, IP.com Electronic Publication Date: Oct. 8, 2010, 5 pgs.

Anonymous, et al., "System and method for affinity detection and management in multi-person chatting environment", An IP.com Prior Art Database Technical Disclosure, IP.com No. IPCOM000219768D, IP.com Electronic Publication Date: Jul. 12, 2012, 21 pages.

Anonymous, et al., "System and Methods to effectively manage IM notifications based on analyzed criteria", An IP.com Prior Art Database Technical Disclosure, IP.com No. IPCOM000246163D, IP.com Electronic Publication Date: May 12, 2016, 5 pgs.

List of IBM Patents and Patent Applications Treated as Related. Filed Jun. 14, 2018. 2 pages.

Oneata, Dan, "Probabilistic Latent Semantic Analysis", Published 2011, pp. 1-7, <http://homepages.inf.ed.ac.uk/rbf/CVonline/LOCAL_COPIES/AV1011/oneata.pdf>.

Pavitt, et al., "Controlling Communication of Notifications to a User", U.S. Appl. No. 15/927,348, filed Mar. 21, 2018.

\* cited by examiner

CONTROL OF NOTIFICATIONS TO A USER OF AN ELECTRONIC MESSAGING SYSTEM

BACKGROUND

The use of computing devices and communication network to exchange information in the form of electronic messages is widely known. In a common application, a user at a personal computing device can utilize a messaging application to communicate with another user of another personal computing device via a communication network. In one specific example, an instant messaging service provider provides users with a client-side application that allows one user to communicate with another user over a network in real time. An instant messaging display interface is presented to each user and enables users to establish relationships with other users (e.g., "buddy lists") and to engage in chats with other users. The exchange of information between users in a chat is often referred to as a thread and is dynamically generated. It is also known for messaging applications to allow communications to be simultaneously transmitted among several users in real-time, thus provisioning a 'group chat'.

SUMMARY

Aspects of the disclosure may include a computer-implemented method, computer program product, computing device and system for controlling notifications to a user of an electronic messaging system.

An example computer-implemented method for controlling notifications to a user of an electronic messaging system. The method comprises determining a level of interest of the user in a topic of a thread of the electronic messaging system. The method also comprises obtaining timing information relating to the timing of the most recent notification associated with the thread. The method further comprises obtaining a measure of similarity between the topic of the thread and a second topic associated with the most recent notification associated with the thread. The method then controls communication of a notification associated with the thread to the user based on the determined level of interest of the user and at least one of the obtained timing information and the obtained measure of similarity.

BRIEF DESCRIPTION OF THE DRAWINGS

Understanding that the drawings depict only illustrative embodiments and are not therefore to be considered limiting in scope, the illustrative embodiments will be described with additional specificity and detail through the use of the accompanying drawings, in which.

DETAILED DESCRIPTION

Figure 1:
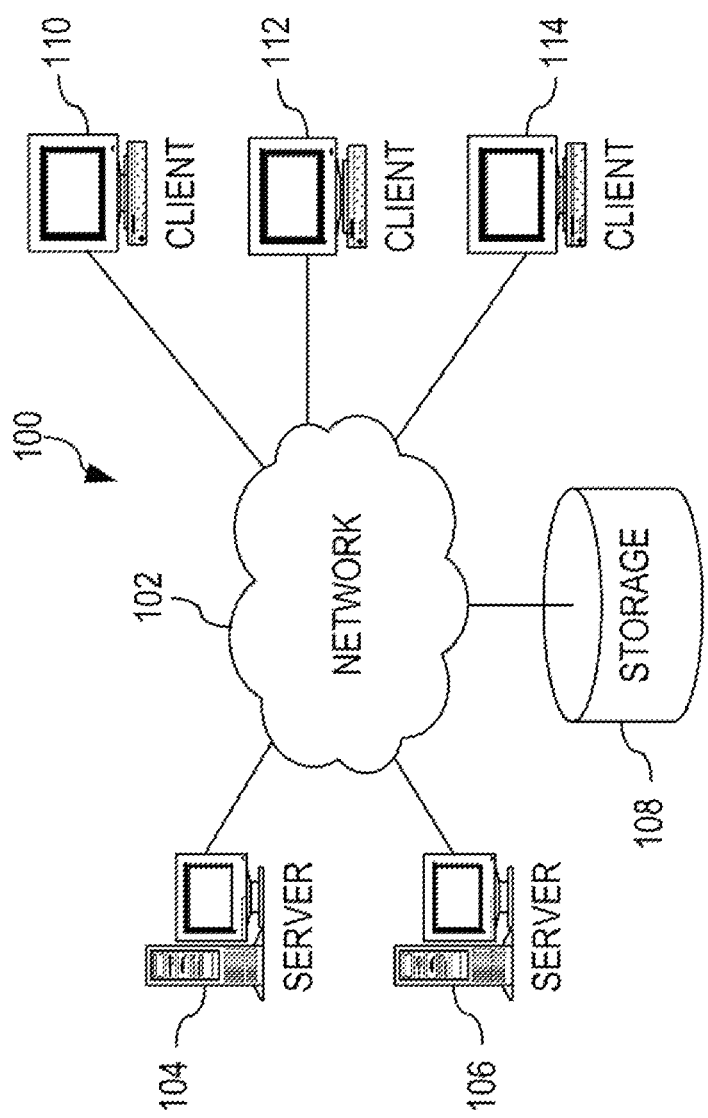
FIG. 1 is a block diagram of an example distributed system in which aspects of the illustrative embodiments may be implemented.

It should be understood that the Figures are merely schematic and are not drawn to scale. In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

The recent popularity of group chats in messaging applications has resulted in the problem of users receiving a large number of notifications (e.g. triggered by each new message), and such notifications may relate to messages, the topic of which one or more group members are not interested in. Current systems enable a user to either receive notifications for all messages in a group chat or not receive notifications for any messages in the group chat. However, if a user selects to not receive any notifications for a given group chat, the user may miss (e.g. not see, overlook or dismiss) important messages or information which are of interest to the user. Further complicating the technical challenge of enabling a system to selectively provide notifications to a user is the fact that each user in the group chat may be interested in different topics and the group chats are not limited to any particular set of topics. Proposed is a concept for controlling notifications to a user of an electronic messaging system associated with a thread of the system. The proposed embodiments address the problems and technical challenges discussed above with respect to electronic messaging systems.

Proposed embodiments may utilize the nature and/or characteristics of a thread of an electronic messaging system so as to provide concepts for controlling communication of a notification associated with the thread to the user. Proposed approaches to controlling notifications to a user are thus enabled due to the context of a user making use of (e.g. viewing or participating in) a thread of a messaging system and previous (e.g. recent) thread activity (such as changes in topic and/or communicated notifications). For example, when a conversation or section topic is known or identified, a user's level of interest in the topic may be determined. Then, deciding whether or not to send the user a notification may not only depend on the user's interest in the topic but may also take account of whether the user has recently received a notification and/or whether the thread topic has varied.

Proposed embodiments may thus take a granular approach to controlling notifications by not only considering a user's interest in a topic but by also considering whether/how the topic of a thread has changed over time. For example, by considering when the user last received a notification and whether the topic associated with that notification is the same as the current thread topic, embodiments may determine if it is appropriate to communicate a notification to the user.

By way of example, embodiments may consider the topic of conversation in an electronic messaging system, and compare the topic against known likes/dislikes of a user. Based on the result of such a comparison, and in consideration of when a notification relating to the topic was last communicated to the user, it may be determined whether or not to communicate a notification relating to the topic. Such an approach may thus take account of a relationship between the current topic of a conversation thread and a previous (e.g. recent or preceding) topic of the conversation thread.

For obtaining a measure of similarity between the topic of the thread and the second topic, a consideration of the topics in a hierarchical representation may be employed. For example, obtaining a measure of similarity may comprise: obtaining a hierarchical representation of a plurality of topics, wherein the plurality of topics include the topic of the thread and the second topic; and determining a measure of distance between the topic of the thread and the second topic in the hierarchical representation.

For instance, the measure of distance may be representative of an ontology relationship between the topic of the thread and the second topic in the hierarchical representation. If the calculated topic of conversation changes from "Soccer Team A" to "Soccer Team B", and a hierarchical representation of topics has both Soccer Team A and Soccer Team B as children of the parent node "Soccer", the ontology relationship between Soccer Team A and Soccer Team B would be a sibling relationship (i.e. they both have the same parent topic). If, however, the topic of conversation changes from "Soccer Team A" to "Rugby Team A", and the hierarchical representation of topics has Rugby Team B as a child of the parent node "Rugby" (which in turn is a sibling of "Soccer"), the ontology relationship between Soccer Team A and Rugby Team A would be a "cousin" relationship. A sibling relationship may be determined to not warrant communication of a new notification, whereas a cousin relationship may be deemed to warrant communication of a new notification.

By way of further example, the measure of distance may be representative of a number of hierarchical levels required to be traversed from the topic of the thread and the second topic to a common ancestor of both the thread and the second topic in the hierarchical representation. Put another way, a distance metric may be based on a degree of separation between the topics and this may be calculated based on the number of tiers required to travel in order to reach a common ancestor of the topics. In the examples described above, it would be required to travel up one level above "Soccer Team A" and one above "Soccer Team B" to reach the common ancestor "Soccer", resulting in a distance of two "2". In the "Soccer Team A" to "Rugby Team A" case, however, it would be required to travel up two levels above "Soccer Team A" and two above "Rugby Team A" to reach the common ancestor "Team Sports", resulting in a distance of four "4". Similarly, if the second topic was deemed to be "Rugby", then the distance would be three "3". Where a minimum distance required to send a notification is three "3", the two cases involving "Rugby Team A" and "Rugby" would be deemed to warrant communication of a new notification.

It will, however, be appreciated that the 'distance' or types of ontology relationships that warrant a new notification may be adjusted or configurable by a user for example.

Some embodiments may further comprise obtaining historical information relating to a previously determined level of interest of the user in the topic of the thread. Controlling communication of the notification associated with the thread to the user may then be further based on the obtained historical information. In this way, previous calculations and/or past activity may be leveraged and accounted for so as to provide a more detailed and accurate assessment of whether or not to communicate a notification to the user.

By way of example, controlling communication of a notification associated with the thread to the user may comprise communicating the notification if the determined level of interest of the user exceeds a predetermined threshold value and at least one of: the obtained timing information meets a predetermined timing requirement; and the obtained measure of similarity meets a predetermined similarity requirement. Thus, in addition to taking account of a user's level of interest in a topic, embodiments may prevent a notification being communicated to a user if a notification has recently been communicated to the user and/or if the topic has not changed from that of a previous notification. Unnecessary repetition of similar notifications may thus be prevented by embodiments.

For determining a level of interest of the user, many different approaches may be employed, including those that are already known and widely recognized. However, in some embodiments, a user's level of interest in a topic may be determined by analyzing the user's engagement with the conversation/section, and such analysis can be based on one or more specific characteristics of how the user makes use of the messaging system. Thus, in some embodiments, it is proposed to use one or more factors of how a user engages with a messaging system to determine his/her level of interest in a topic of a messaging thread.

In particular, it is proposed that a user's level of interest in a topic of a thread may be determined based on one or more of the following: a sentiment of content added to the thread by the user; a dwell time of the user on one or more messages of the thread; a user response to a notification relating to the identified topic; and a pointing position of the user when viewing messages of the thread. Such characteristics or properties of a user's engagement with a thread may be used alone, or in combination, to provide an indication of his/her level of interest in a topic of the thread. By detecting such characteristics/properties, proposed embodiments may take account of a multitude of factors in the context of message system thread so as to gauge a level of interest in a thread topic. In this way, more accurate assessment of a user's level of interest in a topic may be provided.

For example, a message from the user containing the expression "I don't like vegetables" references the topic of vegetables, and so simplistic approaches may (incorrectly) infer that the user is interested in the topic of "vegetables" (because of its use/presence in the message). However, by taking a context-based approach and detecting the negative sentiment of the message towards the topic, proposed embodiments can obtain a better understanding of the likelihood that the user would not be interested in future conversation about vegetables.

In another example, an embodiment may detect a dwell time of the user on one or more messages of the thread. This may, for example, be achieved by detecting a scrolling speed of the user when viewing the one or more messages of the thread. Widely known methods for determining a scroll dwell time may therefore be employed in relation to messages of a chat thread. By understanding a topic of the messages as the user scrolls, it may be subsequently determined whether the user has an interest in that particular topic. For instance, scrolling through a section at a fast pace may suggest the user has little interest in the respective topic. By way of further example, the dwell time may be determined by detecting a pattern of gaze movement of the user when viewing the one or more messages of the thread.

Utilising widely-available eye-tracking capabilities (e.g. that employ a user-facing camera available on any modern smart phone or mobile computing device), embodiments may monitor individual messages that the user may be reading or re-reading, and then this may be utilized to gauge how interested the user is the topic of each message.

Some embodiments may detect a user response to a notification relating to the identified topic by firstly communicating, to the user, the notification relating to the identified topic, and then, secondly, detecting whether the user dismisses or accepts the notification. A concept of assessing notification interaction may therefore be employed by proposed embodiments. In this way, it may be determined whether a user is interested in a given topic based on feedback from notifications that the user is sent. For example, if the user dismisses a notification saying "Your group chat is currently talking about vegetables" without then viewing the conversation, it may be inferred that the user is not interested in the topic of vegetables. Conversely, if the user responds to the notification by opening the group chat (e.g. by clicking a link to the group chat provided by the notification) and interacting with the conversation, it may be inferred that the user is interested in the topic of vegetables. Also, this may be further combined with sentiment analysis of the messages created by the user, so as to obtain further indication of the user's interest. Thus, there may be provided a concept where a link is provided to a user and then a user's response to the link is monitored to assess the user's level of interest. The link may, for example may be posted in a group chat separately from a message notification. Thus, it will be understood that proposed concepts may assess user interaction with a link independently from conventional message notifications for example.

Proposed embodiments may comprise detecting a pointing position of the user when viewing messages of the thread. This may, for example, comprise detecting the pointing position based on either: a touch location at which the user touches a display; or a display position of a cursor controlled by the user. Such embodiments may be based on the premise that where the user's finger (or cursor) is positioned on a display when scrolling through message may be to infer whether the user is interested in the displayed content. For example, it is common that a user will position his/her finger closer to the edge of a mobile phone display/screen if interested in the content displayed by the mobile phone display/screen whereas he/she will position his/her finger closer to the middle of the display/screen if not interested in the displayed content.

By way of further example, embodiments may propose extensions to an electronic messaging system. Such extensions may provide for effective (e.g. more relevant) user notifications to be provided. In this way, the system is able to adapt to the user's interests and changes in the thread topics such that a user may not be overwhelmed with irrelevant and/or unimportant notifications that do not relate to one or more topics of interest to the user.

Illustrative embodiments may therefore provide concepts for controlling the provision of notifications to user of an electronic messaging system. Dynamic notification control concepts may therefore be provided by proposed embodiments.

Modifications and additional steps to a traditional electronic messaging system may also be proposed which may enhance the value and utility of the proposed concepts.

Figure 2:
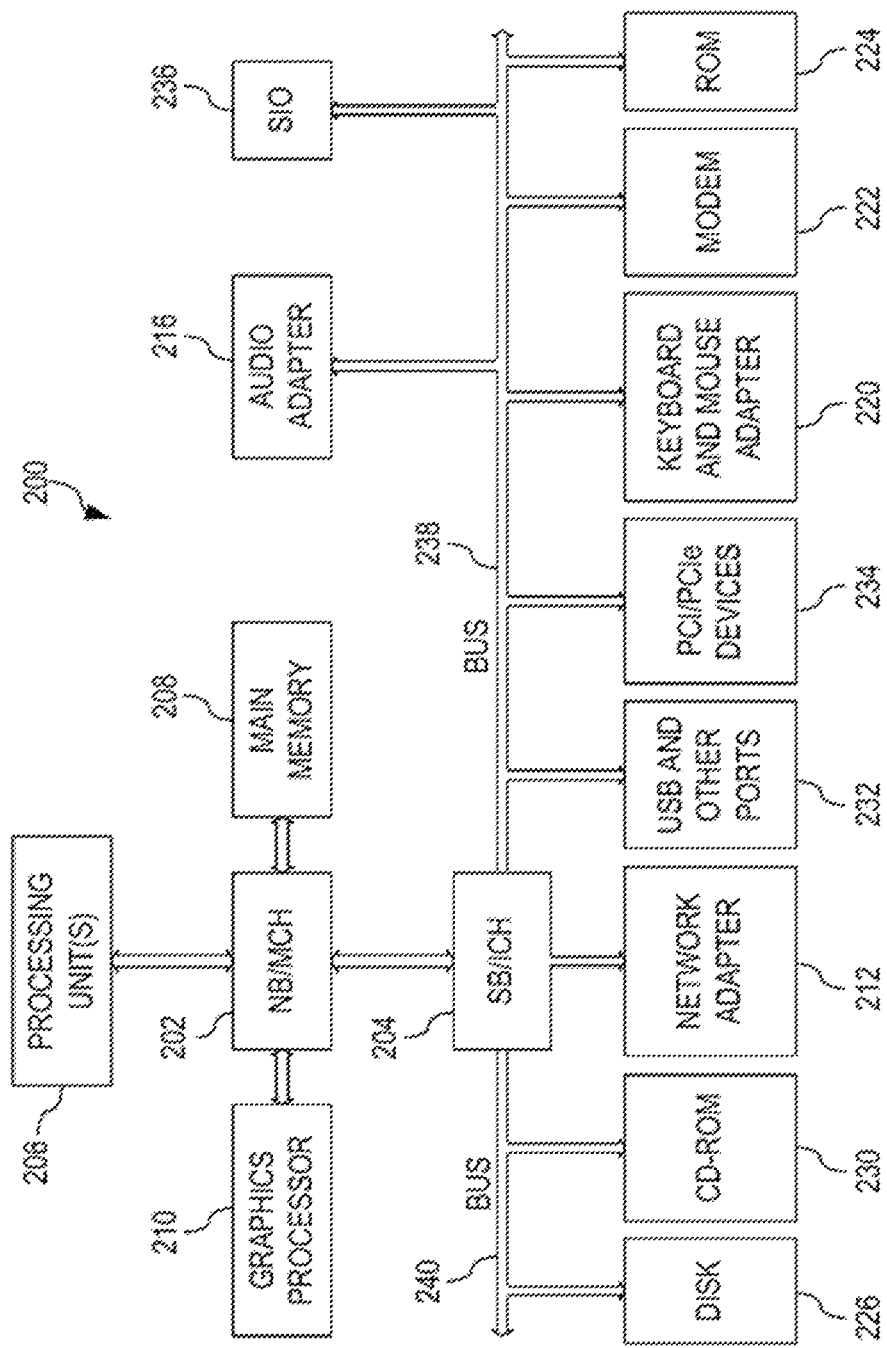
FIG. 2 is a block diagram of an example system in which aspects of the illustrative embodiments may be implemented.

Illustrative embodiments may be utilized in many different types of messaging environments. In order to provide a context for the description of elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the scope of the present invention.

FIG. 1 depicts a pictorial representation of an example distributed messaging system in which aspects of the illustrative embodiments may be implemented. Distributed system 100 may include a network of computers in which aspects of the illustrative embodiments may be implemented. The distributed system 100 contains at least one network 102, which is the medium used to provide communication links between various devices and computers connected together within the distributed data processing system 100. The network 102 may include connections, such as wire, wireless communication links, or fiber optic cables.

In the depicted example, a first 104 and second 106 servers are connected to the network 102 along with a storage unit 108. In addition, clients 110, 112, and 114 are also connected to the network 102. The clients 110, 112, and 114 may be, for example, personal computers, network computers, or the like. In the depicted example, the first server 104 provides data, such as boot files, operating system images, and applications to the clients 110, 112, and 114. Clients 110, 112, and 114 are clients to the first server 104 in the depicted example. The distributed system 100 may include additional servers, clients, and other devices not shown.

In the depicted example, the network 102 is the Internet representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. It is to be understood that, in other embodiments, network 102 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example system 200 in which aspects of the illustrative embodiments may be implemented. The system 200 is an example of a computer, such as client 110 in FIG. 1, in which computer usable code or instructions implementing the processes for illustrative embodiments of the present invention may be located.

In the depicted example, the system 200 employs a hub architecture including a north bridge and memory controller hub (NB/MCH) 202 and a south bridge and input/output (I/O) controller hub (SB/ICH) 204. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) ports and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on the processing unit 206. The operating system coordinates and provides control of various components within the system 200 in FIG. 2. As a client, the operating system may be a commercially available operating system. An object-oriented programming system, such as the Java™ programming system, may run in conjunction with the operating system and provides calls to the operating system from Java™ programs or applications executing on system 200.

As a server, system 200 may be, for example, an IBM® eServer™ System p® computer system, running the Advanced Interactive Executive (AIX®) operating system or the LINUX® operating system. The system 200 may be a symmetric multiprocessor (SMP) system including a plurality of processors in processing unit 206. Alternatively, a single processor system may be employed.

Instructions for the operating system, the programming system, and applications or programs are located on storage devices, such as HDD 226, and may be loaded into main memory 208 for execution by processing unit 206. Similarly, one or more message processing programs according to an embodiment may be adapted to be stored by the storage devices and/or the main memory 208.

The processes for illustrative embodiments of the present invention may be performed by processing unit 206 using computer usable program code, which may be located in a memory such as, for example, main memory 208, ROM 224, or in one or more peripheral devices 226 and 230.

A bus system, such as first bus 238 or second bus 240 as shown in FIG. 2, may comprise one or more buses. Of course, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the system mentioned previously, in some embodiments.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

As detailed above, proposed embodiments provide a method for controlling notifications to a user of an electronic messaging system. Such a proposed method comprises determining a level of interest of the user in a topic of a thread of the electronic messaging system. The method also comprises obtaining timing information relating to the timing of the most recent notification associated with the thread, and further comprises obtaining a measure of similarity between the topic of the thread and a second topic associated with the most recent notification associated with the thread. The proposed method then controls communication of a notification associated with the thread to the user based on the determined level of interest of the user and at least one of the obtained timing information and the obtained measure of similarity.

Accordingly, as has already been mentioned above, many different approaches to determining a level of interest of the user in a topic may be employed, including conventional or widely-known processes such as: techniques track websites browsing history; social media usage tracking; messaging history analysis, etc.

However, alternative approaches may also be proposed. By way of example, and with reference to FIG. 3, there is depicted a flow diagram of an example method 300 of controlling notifications to a user based, in part, on a determined level of interest of a user in a topic of a thread of an electronic messaging system. In this embodiment, the electronic messaging system implements an instant messaging application or service which is further adapted to cater for group chats. Method 300 can be implemented by a processor executing instructions stored in a computer readable storage medium communicatively coupled to the processor. For example, the method 300 can be implemented by a system, such as system 200 discussed above. It is to be understood that the individual acts of method 200 can be implemented in a different order than that described herein and that one or more steps can be omitted, or other steps can be included in other embodiments.

Method 300 begins at block 310. At block 310, text from each of one or more electronic messages in a thread is analyzed to identify one or more topics in the thread. For example, at block 310, a conventional probabilistic Latent Semantic Analysis (PLSA) algorithm can be used. PLSA is a known semantic analysis concept which can be implemented to conduct topic detection in instant messages. For example, it is applicable for cases where: (i) useless terms keep emerging; (ii) the instant messages are very short; (iii) multiple languages are used. Although in this example a PLSA algorithm is implemented, it will be appreciated that other, conventional approaches to structural analysis of chat messages for topic detection can be used. For example, based on the analysis from a collection of sample chat messages, an indicative term-based categorization approach for chat topic detection has been found which incorporates different techniques such as sessionalization of chat messages and the extraction of features from icon text and URLs for pre-processing.

At block 320, interactions of the user with the one or more electronic messages are monitored. For example, one or more characteristics or properties of a user's engagement with the thread are detected in order to provide an indication of his/her level of interest in a topic of the thread. Monitoring interactions of the user can include detecting one or more of: a sentiment of content added to the thread by the user; a dwell time of the user on one or more messages of the thread; a user response to a notification relating to the identified topic; and a pointing position of the user when viewing messages of the thread. This therefore implements an approach to identifying indicators of interest that are enabled due to the context relating to thread of an electronic messaging system. By detecting one or more of such characteristics/properties, information useful for determining a user's level of interest in a topic of the thread is obtained at block 320.

In some embodiments, at block 320, detecting a sentiment of content added to the thread by the user includes detecting a message added to the thread by the user; processing the message with a sentiment analysis algorithm; and identifying a positive or negative sentiment of the detected message based on the sentiment analysis results. For example, the sentiment detection process can employ conventional components such as the Watson Natural Language Understanding service to determine the sentiment associated with the messages. Watson Natural Language Understanding offers a set of services that enable businesses and developers to build applications that understand the content and context of text in webpages, news articles, and blogs. It can be applied to any publicly accessible web page, posted HTML/text document, or a predefined corpus of news articles, and its functions include: Keyword Extraction, Entity Extraction, Sentiment Analysis, Emotion Analysis, Concept Tagging, Relation Extraction, Taxonomy Classification, Author Extraction, and more.

Also, in some embodiments, detecting a dwell time of the user on one or more messages of the thread comprises: detecting a scrolling speed when the user viewing the one or more messages of the thread. Numerous known methods for detecting a scrolling speed and then determining the scroll dwell time can be used, and a detailed description of these is therefore omitted. In other embodiments, detecting a dwell time includes determining a user's gaze. Gaze tracking concepts which, for example, utilize conventional eye-tracking methods (e.g. using a user-facing camera typically available on smartphone) can be employed to monitor individual messages or portions of a thread that the user may be reading or re-reading, and then this can be utilized as an indicator of level of interest in the topic of the message/portion.

Additionally, in some embodiments, detecting a user response to a notification relating to the identified topic comprises communicating, to the user, the notification relating to the identified topic; monitoring a user's response to the notification; and detecting whether the user dismisses or accepts the notification. In some such embodiments, the notification comprises a link to a resource, and detecting whether the user dismisses or accepts the notification comprises detecting if the user uses (e.g. clicks, selects or activates) the link.

Furthermore, in some embodiments, detecting a pointing position of the user when viewing messages of the thread comprises monitoring user inputs such as a touch location at which the user touches a display, or a display position of a cursor controlled by the user; and detecting the pointing position based the monitored inputs.

Method 300 then proceeds to block 330 at which the monitored interactions are compared with one or more respective reference interactions to determine a level of interest of the user in the identified topic. Thus, at block 330, a level of interest of the user is determined as a function of the detected characteristic(s) of the user's interaction and behavior, such as sentiment of content added to the thread by the user; dwell time of the user on one or more messages of the thread; user response to a notification relating to the identified topic; and/or pointing position of the user when viewing messages of the thread.

By way of example, detected sentiment of content added by the user can provide a relatively straightforward indication of a level of interest in an associated topic. For example, a message from the user containing the expression "I find Basketball boring" references the topic of basketball, and so, unlike simplistic approaches which may incorrectly infer that the user is interested in the topic of "Basketball" (because of its use/presence in the message, method 300 can use the detected negative sentiment of the message towards the topic of basketball and infer that the user has a low level of interest in the topic of basketball.

A further example may also be given with respect to determining a level of interest based on a detected dwell time. Scrolling through a message thread at a fast pace can suggest that the user has little interest in the identified topic of the thread. Thus, a function which represents an inversely-proportional relationship between dwell time and level of interest may be implemented to determine a level of interest based on a detected dwell time.

Another example of determining a level of interest may be provided in relation to detected notification interaction. From detected interaction with an interaction, it can be inferred whether a user is interested in the topic associated with the notification using relatively simple assumption. For example, if it is detected that the user dismissed a notification saying "Your group chat is currently talking about soccer" without then viewing the conversation, it can be determined that the user is unlikely to be interested in soccer. Conversely, it can be determined that the user is likely to be interested in soccer if the user opens the notification and interacts with the linked/reference conversation. Further inference regarding the user's level of interest in the topic can then also be drawn from detected sentiment of messages that the user adds to the discussion. This demonstrates how the various detected characteristics of user interaction with an electronic messaging system may be used in combination to determine a user's level of interest in a topic of message thread.

At block 340, there is obtained a measure of similarity between the topic of the thread determined at block 310 and a second topic associated with the most recent notification associated with the thread. In this embodiment obtaining a measure of similarity between the determined topic of the thread and the second topic comprises obtaining a hierarchical representation of a plurality of topics, wherein the plurality of topics includes the topic of the thread and the second topic. Additionally, obtaining the measure of similarity comprises determining a measure of distance between the determined topic of the thread and the second topic in the hierarchical representation. By way of example, the measure of distance may be representative of an ontology relationship between the determined topic of the thread and the second topic in the hierarchical representation. In another example, the measure of distance may be representative of a number of hierarchical levels required to be traversed from the determined topic of the thread and the second topic to a common ancestor of both the determined topic of the thread and the second topic in the hierarchical representation (i.e. a measure of separation of the topics in the hierarchical representation).

At block 350, timing information relating to the timing of the most recent notification associated with the thread is obtained. For instance, a record or database of the timings of earlier notifications and their associated topics may be accessed so as to retrieve information regarding the most recent (e.g. the last or directly preceding) notification. Such timing information may thus detail a time and topic associated with the most recent notification.

At block 360, communication of a notification associated with the thread to the user is controlled based on the determined level of interest of the user (e.g. from block 330) and at least one of the obtained timing information (e.g. from block 350) and the obtained measure of similarity (e.g. from block 340). For instance, in some embodiments, a notification is only communicated to the user if the determined level of interest of the user exceeds a predetermined threshold value and at least one of: the obtained timing information meets a predetermined timing requirement; and the obtained measure of similarity meets a predetermined similarity requirement. This may, for example, employ a process of comparing the determined level of interest of the user with a first threshold value, comparing the measure of similarity with a second threshold value, and comparing an amount of time that has elapsed since the last notification regarding the topic with a third threshold value. The determination of whether or not to communicate the notification is then based on the comparison results.

It is also noted that, in some embodiments, controlling the notification includes obtaining historical information relating to a previously determined level of interest of the user in the topic of the thread (e.g. from a database) and controlling communication of the notification associated with the thread to the user based on the obtained historical information. In this way, previously obtained information about a user's interest in a topic can be used, thus facilitating an improved (e.g. more accurate) assessment of the user's interest(s) and whether to communicate a notification.

Figure 3:
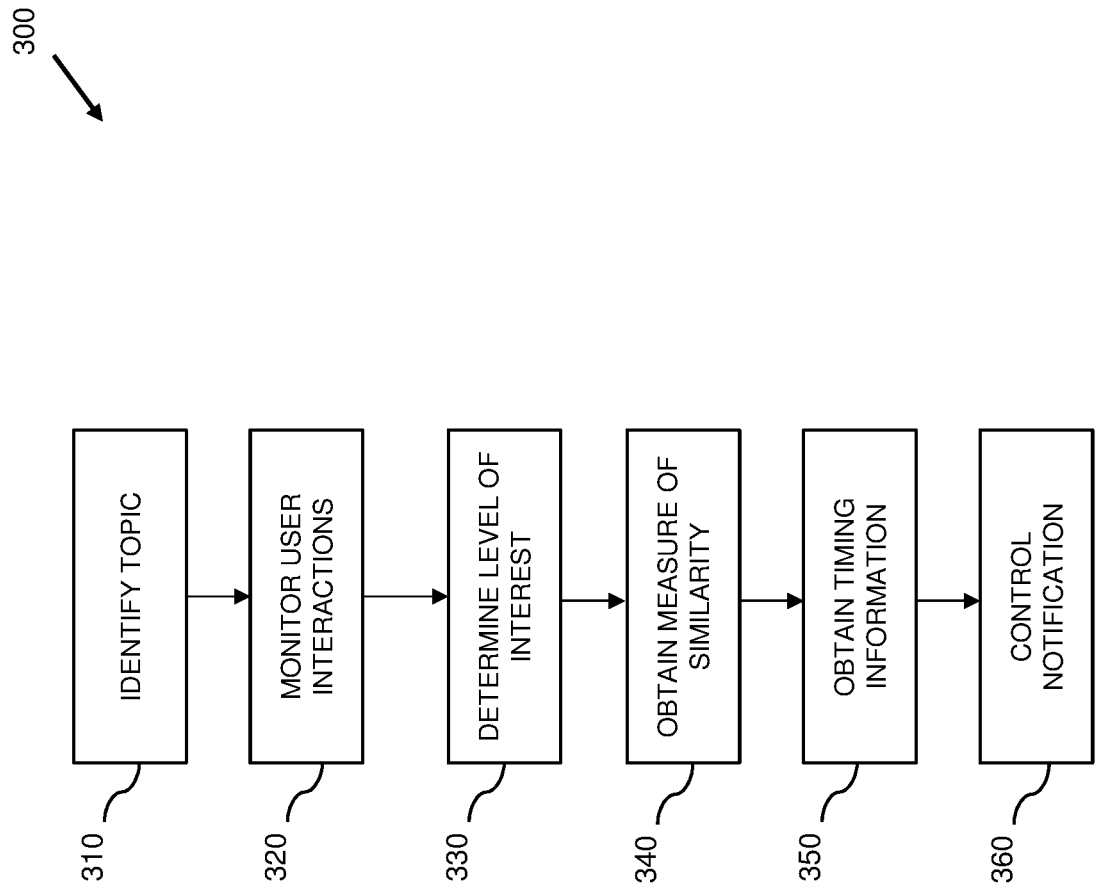
FIG. 3 is a flow diagram of one embodiment of an example method for controlling notifications associated with a thread of an electronic messaging system to a user.

Also, it will be appreciated that, although the embodiment of FIG. 3 has been described as employing particular processes, other processes or methodologies for detecting characteristics of the user's interaction and behavior may be employed.

For example, the process of detecting a user response to a notification relating to the identified topic may comprises monitoring user interaction with a link associated with the notification. If a participant of a conversation shares a link for example, an embodiment may be adapted to monitor a user's interaction with this link to further determine their interests. In particular, by examining the content of the link, one may employ entity extraction to gauge a summary topic that the article/link refers to and then, if it is detected that the user does not use the link, it can be determined that the user has no interest in the identified topic. Conversely, if it is detected that the user does use the link, it can be determined that that user does have some level of interest in the topic.

By way of further example, dwell time may be determined based on a user's gaze. Gaze tracking concepts which, for example, utilize conventional eye-tracking methods (e.g. using a user-facing camera typically available on smartphone) can be employed to monitor individual messages or portions of a thread that the user may be reading or re-reading, and then this can be utilized as an indicator of level of interest in the topic of the message/portion.

From the above description, it will be appreciated that there is proposed the concept of detecting one or more characteristics of a user's interaction with a messaging system as a way of providing an indication of the user's interest in a topic of a thread of the messaging system. This can be implemented on a conversation-by-conversation basis, and/or utilized across multiple threads of discussions. For instance, information from a group chat containing "Person 1", "Person 2" and "Person 3" may be passed to a conversation thread containing just "Person 1" and "Person 2".

By combing such information regarding a user's interest in a topic with information about how recently the user has received a notification and/or for which topic(s) the user has received a notification, the communication of a notification associated with a thread of a messaging system to the user may be controlled. Thus, a determined level of interest of a user in a topic of a thread of an electronic messaging system may be employed in conjunction with information relating to preceding/earlier notifications for the purpose of controlling the notifications in the messaging system. For instance, a notification may be controlled so that it is only communicated to a user if it relates to a topic that the user has been determined to have a high level of interest in and if the user has not recently received a communication (e.g. in a preceding timeframe of one minute). In this way, notifications may be automatically filtered according to a user's determined interest(s) and previous notification activity, thereby reducing or avoiding the provision of irrelevant, repetitive and/or nuisance notifications.

Figure 4:
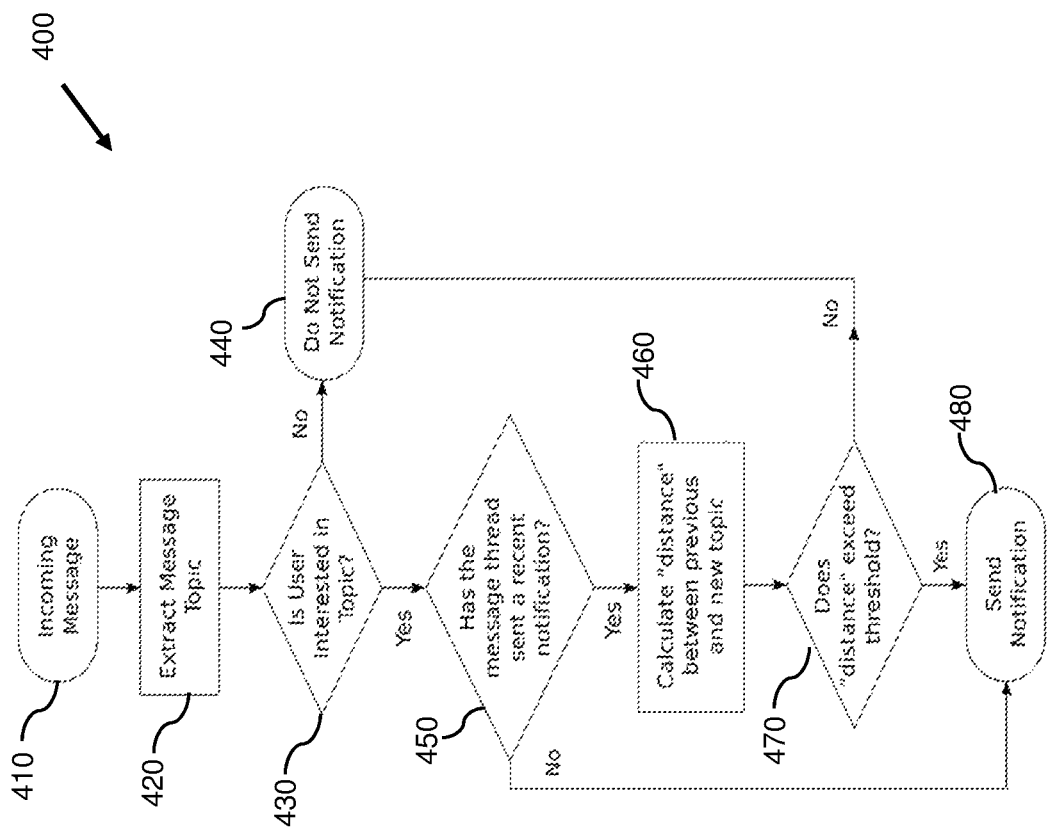
FIG. 4 is a flow diagram of a method for controlling notifications associated with a thread of an electronic messaging system to a user according to an embodiment.

Referring now to FIG. 4, there is depicted a flow diagram of one embodiment of an example method 400 for controlling notifications to a user of an electronic messaging system associated with a thread of the system.

At block 410, an incoming message of the messaging system is received. Next, at block 420, the topic of the message is extracted. For example, at block 420, a conventional probabilistic Latent Semantic Analysis (PLSA) algorithm can be implemented. PLSA conducts topic detection and is particularly suitable for short messages. Although a PLSA algorithm is implemented, in this example, it will be appreciated that other, conventional approaches to structural analysis of messages for topic detection and extraction can be used.

At block 430, it is determined whether or not the user is interested in the topic. By way of example, such determination can be undertaken by determining the user's level of interest in the topic (e.g. as discussed above with respect to FIG. 3) and then comparing the determined level of interest with a predetermined threshold value.

If the user is determined to not be interested in the topic (e.g. if the determined level of interest does not exceed a predetermined threshold value), communication of a notification relating to the received message is prevented at block 440. Conversely, if it is determined at block 430 that the user is interested in the topic (e.g. if the determined level of interest exceeds the predetermined threshold value), the method proceeds to block 450.

At block 450, it is determined whether the messaging system has sent a recent notification to the user on the same message thread. By way of example, block 450 may be undertaken by obtaining timing information relating to the timing of the most recent notification communicated to the user. For instance, a database of the timings of earlier notifications and their associated user(s) and topic(s) may be accessed so as to retrieve information regarding the most recent (e.g. the last or directly preceding) notification. The time elapsed since the most recent notification to the user may then be compared with a predetermined time value for example.

If it is determined that no recent notification has been sent to the user on the same thread (e.g. if the time elapsed since the most recent notification to the user on same thread exceeds a predetermined time value), the method proceeds to block 480, at which a notification relating to the received message is communicated. Conversely, if it is determined at block 450 that a notification has recently been sent to the user on the same thread (e.g. if the time elapsed since the most recent notification to the user on the same thread does not exceed the predetermined time value), the method proceeds to block 460.

At block 460, a distance (i.e. measure of similarity) between the identified topic of the message and the previous topic of the message thread is calculated. As detailed above, such calculation of distance between two topics may be based on an ontology relationship between the topics when represented in a hierarchical structure. It will, however, be understood the other methods of calculating a distance (i.e. measure of similarity) between the message topic and previous topic may be employed.

At block 470, it is determined whether the calculated distance between the identified topic of the message and the previous topic of the message thread exceeds a threshold value. If the calculated distance exceeds the threshold value (such that there has been a noteworthy change of topic in the message thread for example), the method proceeds to block 480 at which a notification relating to the received message is communicated to the user. Conversely, if the calculated distance does not exceed the threshold value (such that there has not been a noteworthy change of topic in the message thread for example), the method proceeds to block 440 at which communication of a notification relating to the received message is prevented.

From the description provided above, it will be understood that proposed embodiments may utilize the nature and/or characteristics of user interaction with a thread of an electronic messaging system, along with preceding thread activity, so as to provide concepts for controlling the provision of a notification to the user. This may allow for highly efficient notification provision, since notifications may be controlled or communicated to user based on a determined level of interest the user has in a topic and consideration of whether preceding activity in the thread may result in a notification being unwarranted (e.g. considered useless, unnecessary, redundant or unwanted).

Embodiments may therefore be provided as extensions to existing electronic messaging systems. Such extensions may provide for effective (e.g. more relevant and/or more useful) user notifications to be provided. In this way, a user may not be overwhelmed with irrelevant and/or unimportant notifications.

In some embodiments, there may be provided a system comprising a processing arrangement adapted to carry out any method previously described with reference to FIGS. 1 to 4.

Figure 5:
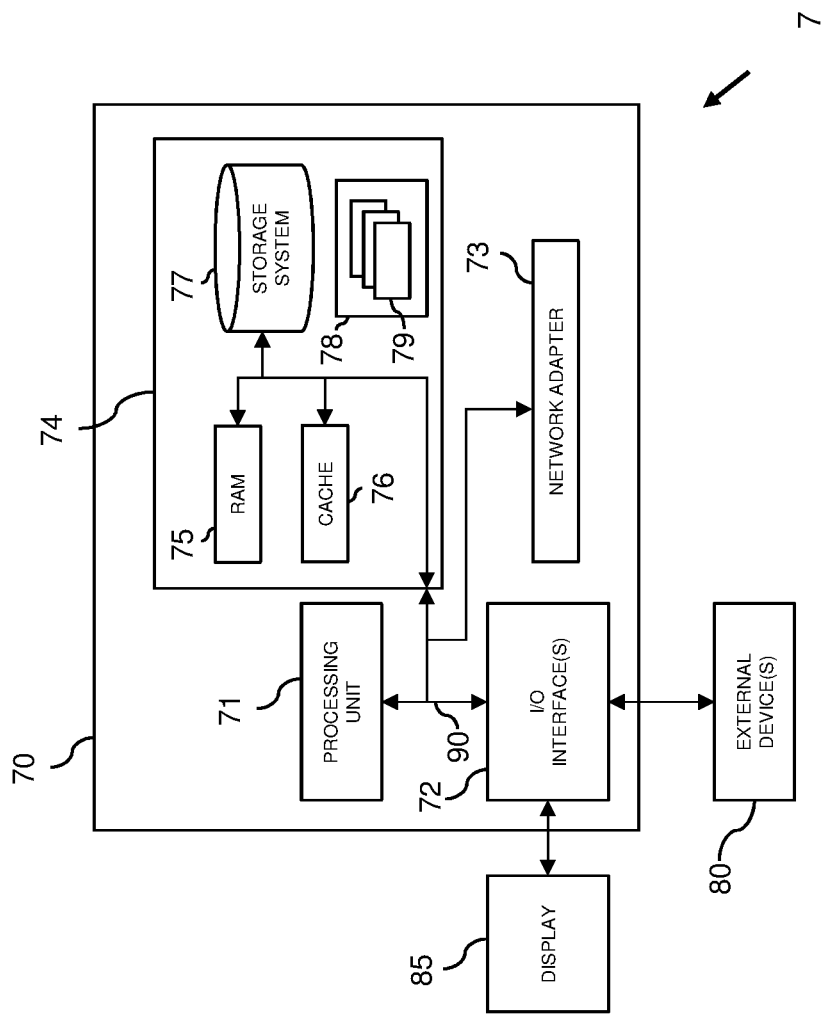
FIG. 5 illustrates a system for controlling notifications associated with a thread of an electronic messaging system to a user according to an embodiment.

By way of example, as illustrated in FIG. 5, embodiments may comprise a computer system 70, which may form part of a networked system 7. The components of computer system/server 70 may include, but are not limited to, one or more processing arrangements, for example comprising processors or processing units 71, a system memory 74, and a bus 90 that couples various system components including system memory 74 to processing unit 71.

Bus 90 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 70 typically includes a variety of computer system readable media. Such media may be any available media that is accessible by computer system/server 70, and it includes both volatile and non-volatile media, removable and non-removable media.

System memory 74 can include computer system readable media in the form of volatile memory, such as random access memory (RAM) 75 and/or cache memory 76. Computer system/server 70 may further include other removable/non-removable, volatile/non-volatile computer system storage media. By way of example only, storage system 74 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 90 by one or more data media interfaces. As will be further depicted and described below, memory 74 may include at least one program product having a set (e.g., at least one) of program modules that are configured to carry out the functions of embodiments of the invention.

Program/utility 78, having a set (at least one) of program modules 79, may be stored in memory 74 by way of example, and not limitation, as well as an operating system, one or more application programs, other program modules, and program data. Each of the operating system, one or more application programs, other program modules, and program data or some combination thereof, may include an implementation of a networking environment. Program modules 79 generally carry out the functions and/or methodologies of embodiments of the invention as described herein.

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73. As depicted, network adapter 73 communicates with the other components of computer system/server 70 via bus 90. It should be understood that although not shown, other hardware and/or software components could be used in conjunction with computer system/server 70. Examples, include, but are not limited to: microcode, device drivers, redundant processing units, external disk drive arrays, RAID systems, tape drives, and data archival storage systems, etc.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer program product for controlling notifications to a user of an electronic messaging system, the computer program product comprising a computer readable storage medium having program instructions embodied thereon, the program instructions executable by a processing unit to cause the processing unit to:
    determine a level of interest of the user in a first topic in a new message of a thread of the electronic messaging system, the thread including the first topic and a second topic;
    obtain timing information relating to a timing of communicating a most recent notification associated with the thread, the most recent notification associated with the second topic;
    obtain a measure of similarity between the first topic of the thread and the second topic associated with the most recent notification associated with the thread; and
    control communication of a notification regarding the new message associated with the thread to the user based on the determined level of interest of the user, the obtained timing information, and the obtained measure of similarity.

2. The computer program product of claim 1, wherein the program instructions are further configured to cause the processing unit to control communication of the notification regarding the new message associated with the thread to the user by:
    communicating the notification in response to determining that the determined level of interest of the user exceeds a predetermined threshold value and in response to at least one of:
        determining that the obtained timing information meets a predetermined timing requirement; and
        determining that the obtained measure of similarity meets a predetermined similarity requirement.

3. A system for controlling notifications to a user of an electronic messaging system, the system comprising:
    a storage medium configured to store data;
    an input/output interface; and
    a processing unit communicatively coupled to the storage medium and to the input/output interface, wherein the processing unit is configured to:
        determine a level of interest of the user in a first topic in a new message of a thread of the electronic messaging system, the thread including the first topic and a second topic;
        obtain timing information relating to a timing of communicating a most recent notification associated with the thread, the most recent notification associated with the second topic;
        obtain a measure of similarity between the first topic of the thread and the second topic associated with the most recent notification associated with the thread; and
        control communication of a notification regarding the new message associated with the thread to the user based on the determined level of interest of the user, the obtained timing information, and the obtained measure of similarity.

4. The system of claim 3, wherein the processing unit is further configured to:
    obtain a hierarchical representation of a plurality of topics, the plurality of topics including the first topic of the thread and the second topic; and
    determine a measure of distance between the first topic of the thread and the second topic in the hierarchical representation.

5. The system of claim 4, wherein the measure of distance is representative of an ontology relationship between the first topic of the thread and the second topic in the hierarchical representation.

6. The system of claim 4, wherein the measure of distance is representative of a number of hierarchical levels required to be traversed from the first topic of the thread and the second topic to a common ancestor of both the first topic of the thread and the second topic in the hierarchical representation.

7. The system of claim 3, wherein the processing unit is further configured to:
    obtain historical information relating to a previously determined level of interest of the user in the first topic of the thread; and
    control communication of the notification associated with the thread to the user further based on the obtained historical information.

8. The system of claim 3, wherein the processing unit is configured to control communication of the notification regarding the new message associated with the thread to the user by:
    communicating the notification in response to determining that the determined level of interest of the user exceeds a predetermined threshold value and in response to at least one of:
        determining that the obtained timing information meets a predetermined timing requirement; and
        determining that the obtained measure of similarity meets a predetermined similarity requirement.

* * * * *